(12) United States Patent
Oh

(10) Patent No.: US 6,341,111 B1
(45) Date of Patent: Jan. 22, 2002

(54) APPARATUS FOR DETECTING AND RESTORING PHYSICAL IDENTIFICATION

(75) Inventor: Cheol-gyun Oh, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/421,110

(22) Filed: Oct. 19, 1999

(30) Foreign Application Priority Data

Oct. 19, 1998 (KR) .............................. 98-43609

(51) Int. Cl.$^7$ ................................ G11B 7/00
(52) U.S. Cl. .................. 369/47.22; 369/53.34
(58) Field of Search .......................... 369/47.22, 53.31, 369/53.34, 53.44; 360/53

(56) References Cited

U.S. PATENT DOCUMENTS 5,623,467 A * 4/1997 Kato et al. ............ 369/53.34 X
5,740,358 A * 4/1998 Geldman et al. ......... 360/53 X
5,838,658 A * 11/1998 Nakane et al. ....... 369/275.3 X

* cited by examiner

Primary Examiner—Aristotelis M. Psitos
(74) Attorney, Agent, or Firm—Sughrue Mion, PLLC

(57) ABSTRACT

An apparatus for detecting and restoring physical identification data (PID) which is the physical position information of sectors arranged on an optical disk, is used in an optical disk recording/reproducing system having a radio frequency amplification unit, includes a pattern detector for outputting an address mark detection signal and a PID pattern upon detecting an AM pattern, and the PID pattern from an eight-to-fourteen modulation (EFM) data stream in the enable section of input signals, a PID error detecting unit for detecting the generation or non-generation of an error by decoding the received PID pattern, and outputting a PID error signal, a sector counting unit for counting the remaining size of a corresponding sector and outputting a counted value as a channel bit clock counting value, a PID window generator for receiving the channel bit clock counting value from the sector counting unit, generating a window signal for PID detection when the counting of a sector is concluded, and outputting the window signal to the AM and PID detector, and a PID continuous determining unit for determining the continuity or noncontinuity of PID by monitoring the input of the address mark detection signal, and outputting a PID position information value, corresponding to a finally received address mark detection signal, to the sector counting unit when the counted value of the error signal is greater than a predetermined threshold value. The apparatus detects and restores for a microcomputer a PID pattern, regardless of degradation and defects of an optical disk (DVD-RAM) surface.

7 Claims, 5 Drawing Sheets

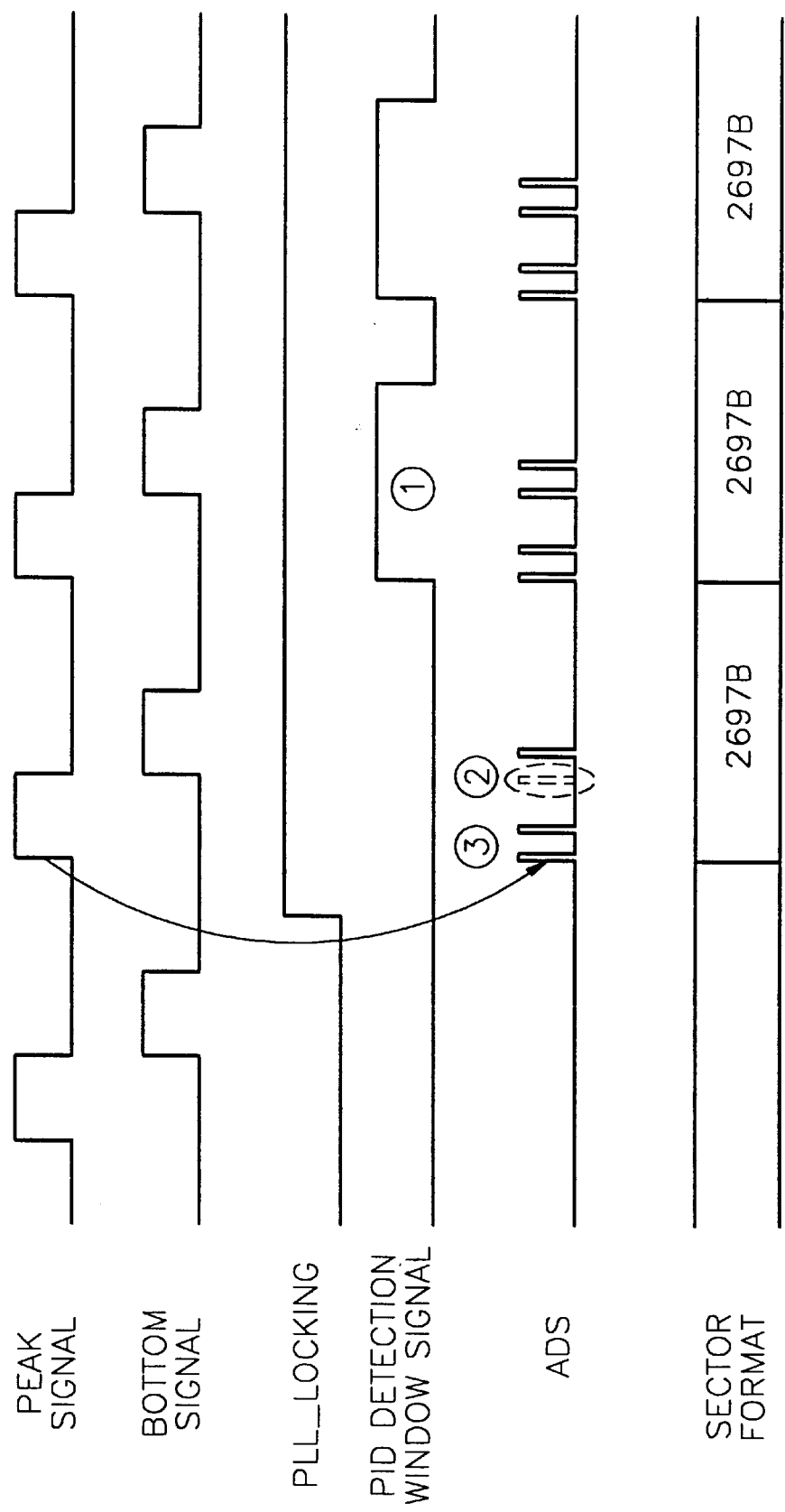

APPARATUS FOR DETECTING AND RESTORING PHYSICAL IDENTIFICATION

BACKGROUND OF THE INVENTION

1. Field of the Invention

The present invention relates to an apparatus for detecting and restoring physical identification (PID) data in an optical recording/reproducing system, and more particularly, to an apparatus for detecting and restoring PID data which is physical position information of sectors arranged on an optical disk surface.

2. Description of the Related Art

Recently, the spread of optical disk reproducing systems has rapidly risen. In particular, the capacity for storing data has become enormous due to the development of a new optical recording medium and a data compression method. Systems for searching for and reproducing an enormous amount of data at a high speed have been researched. Also, systems have been produced for recording predetermined data on an optical disk surface, as well as reproducing recorded data. Systems such as digital versatile disc read only memories (DVD-ROMs), DVD-RAMs, or compact disk rewritable (CD-RW) drives are good examples of optical disk recording/reproducing systems which presently are receiving much attention.

In the optical disk recording/reproducing systems as described above, the recording and reproducing of data must be preceded by the identification of the positions of the sectors arranged on the surface of the optical disk. On an optical disk, a header field has physical identification data (PID) to define the positions of the sectors arranged on the optical disk surface. The system detects and restores the PID data and identifies the location of a sector where a pickup is positioned. FIGS. 1A, 1B, 1C and 1D show the format of one sector among the plurality of sectors spirally arranged on a DVD-RAM disk.

The fact that a conventional optical disk recording/reproducing system can fail in detecting PID data will now be described with reference to FIGS. 1A, 1B, 1C and 1D. Referring to FIG. 1A, each of the sectors spirally arranged on a DVD-RAM disk has a 128-byte header field and a 2418-byte data field where user data is actually recorded. Referring to FIG. 1B, the header field includes four individual header fields each having a voltage frequency oscillator (VFO) field, an address mark (AM) field, a PID field, an identification error detection (IED) field, and a post-Amble (PA) field. The VFO field is used to lock PLL synchronization of lead channel bits. The AM field of 3 bytes is used to provide synchronization timing for detecting the PID data located behind the AM field. The IED field is used as parity information for detecting a PID error, and the PA field is used as a gap for providing a time margin upon decoding PID data.

Referring to FIG. 1C, the PID field is roughly divided into a sector information field and a field where a sector number is recorded. Referring to FIG. 1D, the sector information field is sub-divided into a reserved field which is a signal-free section, a PID number field, a sector type field, and a layer number field. Data recorded in the PID number field is in the form of "–01b", "–10b" or "11b", and is used as identification information ID1 through ID4 of the header field. Information data indicating whether data can be recorded in a corresponding sector, is recorded in the sector type field, and its form is classified into the following:

"–000b": read-only sector,
"–001b–010b": reserved,
"–100b": rewritable first sector in a track,
"–101b": rewritable last sector in a track,
"–110b": rewritable before last sector in a track, and
"–111b": rewritable other sector in a track.

When data recorded in the layer number field is in the form of "–0b", the field denotes a layer 0, and when data recorded in the layer number field is in the form of "–1b", the field denotes a reserved field.

The waveform of a lead signal, that is, a signal picked-up from the header field of a sector having the above-described format, is shown in FIGS. 2A and 2B.

FIGS. 2A and 2B are waveform views of a lead signal in the header field of a groove sector and in the header field of a land sector, respectively. In general, the pit depth of a header field is greater than or smaller than the pit depth of a data field.

If the DC level value of a lead signal picked-up from the data field is set to "A", the DC level value of a lead signal picked-up from the header field is greater than or smaller than the level A as shown in FIGS. 2A and 2B. FIG. 2A shows a lead signal waveform when the pit depth of header fields 1 and 2 is smaller than that of a data field, and a lead signal waveform when the pit depth of the header fields 3 and 4 is greater than that of a data field in the groove sector. As shown in FIG. 2B, a lead signal waveform contrary to the lead signal picked-up from the groove sector is obtained in the land sector.

A typical radio frequency (RF) amplification unit included in an optical disk recording/reproducing system amplifies the level of a lead signal read from a pickup portion to a level that can be processed in the next step, shapes the waveform of the amplified signal, and outputs the resultant signal to a digital signal processor (DSP) which acts as a data decoder. If a lead signal as shown in FIGS. 2A and 2B is input to the RF amplification unit, a peak signal and a bottom signal, which are types of window signals, as shown in FIG. 4, are generated by the RF amplification unit. An AM and PID detection unit detects AM and PID in the enable section of the peak and bottom signals, so that a control unit for performing general control of a system can finally determine a sector where a pickup is currently positioned.

However, if an optical disk surface is degraded due to repetition of recording/reproduction, or if various scratches exist on the optical disk surface due to the carelessness of a user, the peak signal and bottom signal described above will not be normally generated. The peak signal and bottom signal can also be erroneously generated within the data field. Accordingly, there is a need for an optical disk recording/reproducing system that properly detects and determines or restores PID data even in a case in which no peak signal and/or bottom signal is generated. Also, there is a need for an apparatus which can detect PID data in a normal manner even when signals similar to the peak and bottom signals are generated in the data field.

SUMMARY OF THE INVENTION

An object of the present invention is to provide an apparatus which can properly detect and restore PID data, which is physical position information of a sector, regardless of whether the surface of an optical disk is degraded or damaged, in an optical disk recording/reproducing system.

Another object of the present invention is to provide an apparatus which can properly detect and restore PID data in a digital versatile disk-random access memory (DVD-RAM)

system even if peak and bottom signals are detected in a lead signal picked up in a data field.

Accordingly, to achieve the above objectives, the present invention provides an apparatus for detecting and restoring physical identification (PID) in an optical disk recording/reproducing system having a radio frequency amplification unit, the apparatus comprising; an address mark (AM) and PID detector for outputting an address mark detection signal and a PID pattern upon detecting an AM pattern, and the PID pattern from an eight-to-fourteen modulation (EFM) data stream in the enable section of input signals; a PID error detecting unit for detecting the generation or non-generation of an error by decoding the received PID pattern, and outputting a PID error signal; a sector counting unit for counting the remaining size of a corresponding sector and outputting a counted value as a channel bit clock counting value; a PID window generator for receiving the channel bit clock counting value from the sector counting unit, generating a window signal for PID detection when the counting of a sector is concluded, and outputting the window signal to the AM and PID detector; and a PID continuous determining unit for determining the continuity or noncontinuity of PID by monitoring the input of the address mark detection signal, and outputting a PID position information value, corresponding to a finally received address mark detection signal, to the sector counting unit when the counted value of the error signal is greater than a predetermined threshold value.

BRIEF DESCRIPTION OF THE DRAWINGS

The above objectives and advantages of the present invention will become more apparent by virtue of the below description of a preferred embodiment thereof with reference to the attached drawings in which:

FIG. 4 is a timing diagram illustrating the operation of the PID data detecting and restoring apparatus according to an embodiment of the present invention.

DESCRIPTION OF THE PREFERRED EMBODIMENT

Figure 1A:
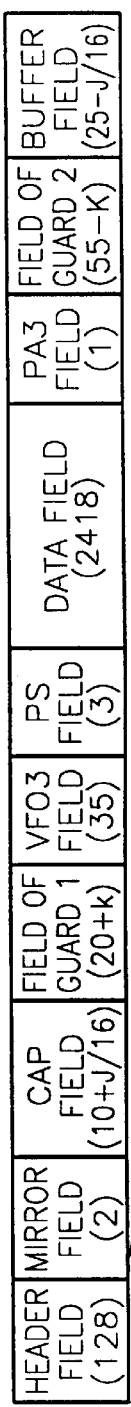
FIGS. 1A, 1B, 1C and 1D show the format of one sector among a plurality of sectors spirally arranged on a DVD-RAM disk.
Figure 1B:
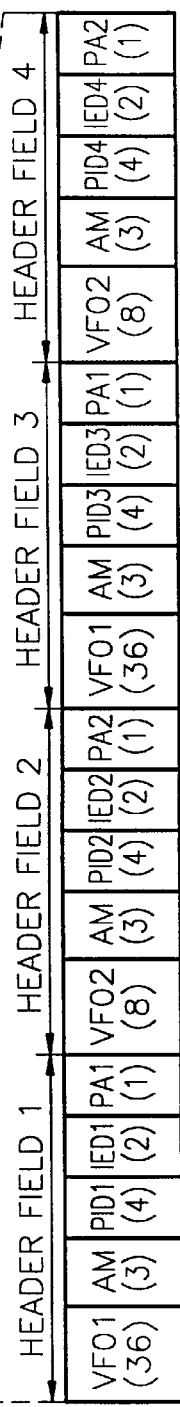
Figure 1C:
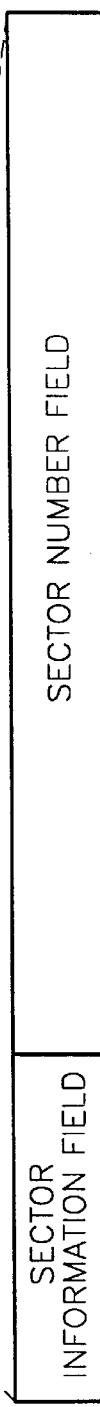
Figure 1D:
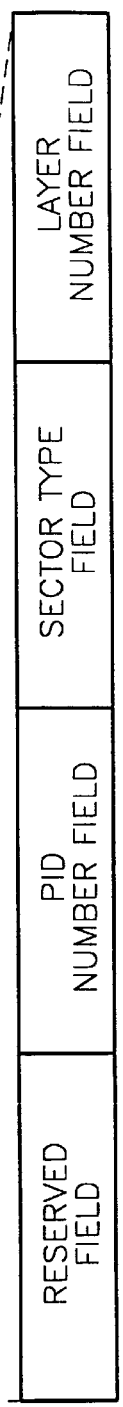
Figure 2A:
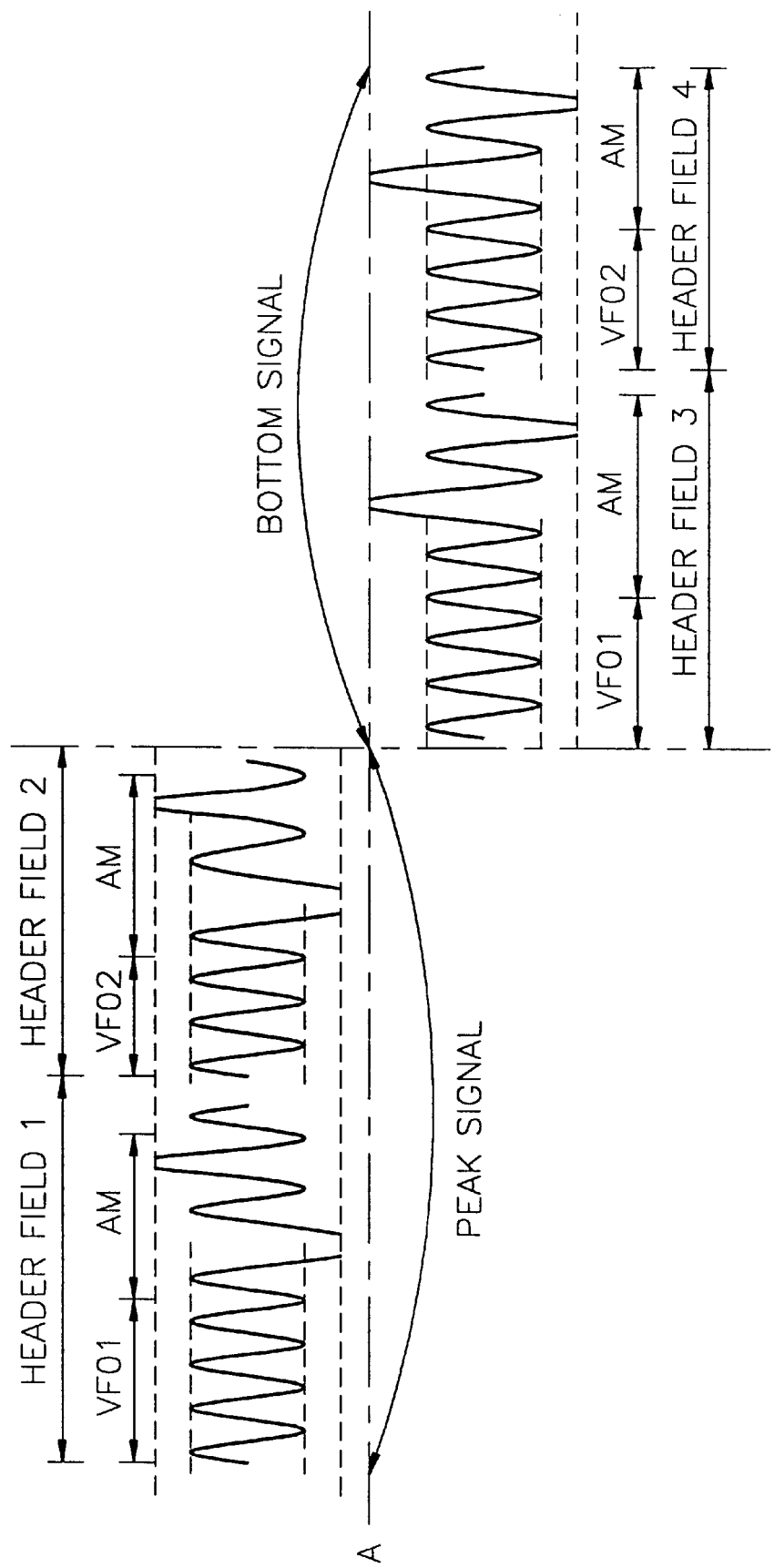
FIGS. 2A and 2B show waveforms of lead signals in the header field of a groove sector and in the header field of a land sector, respectively.
Figure 2B:
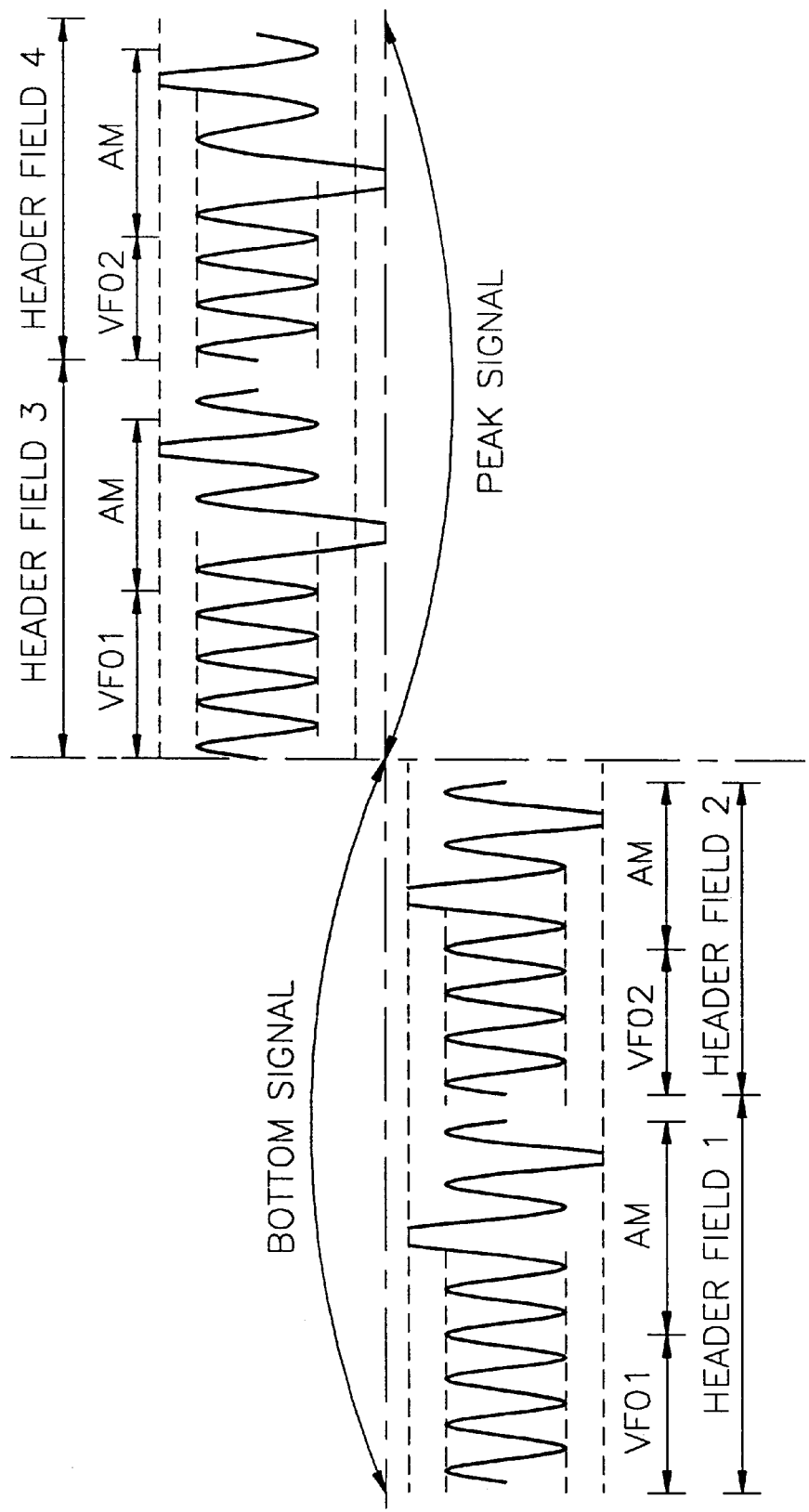
Figure 3:
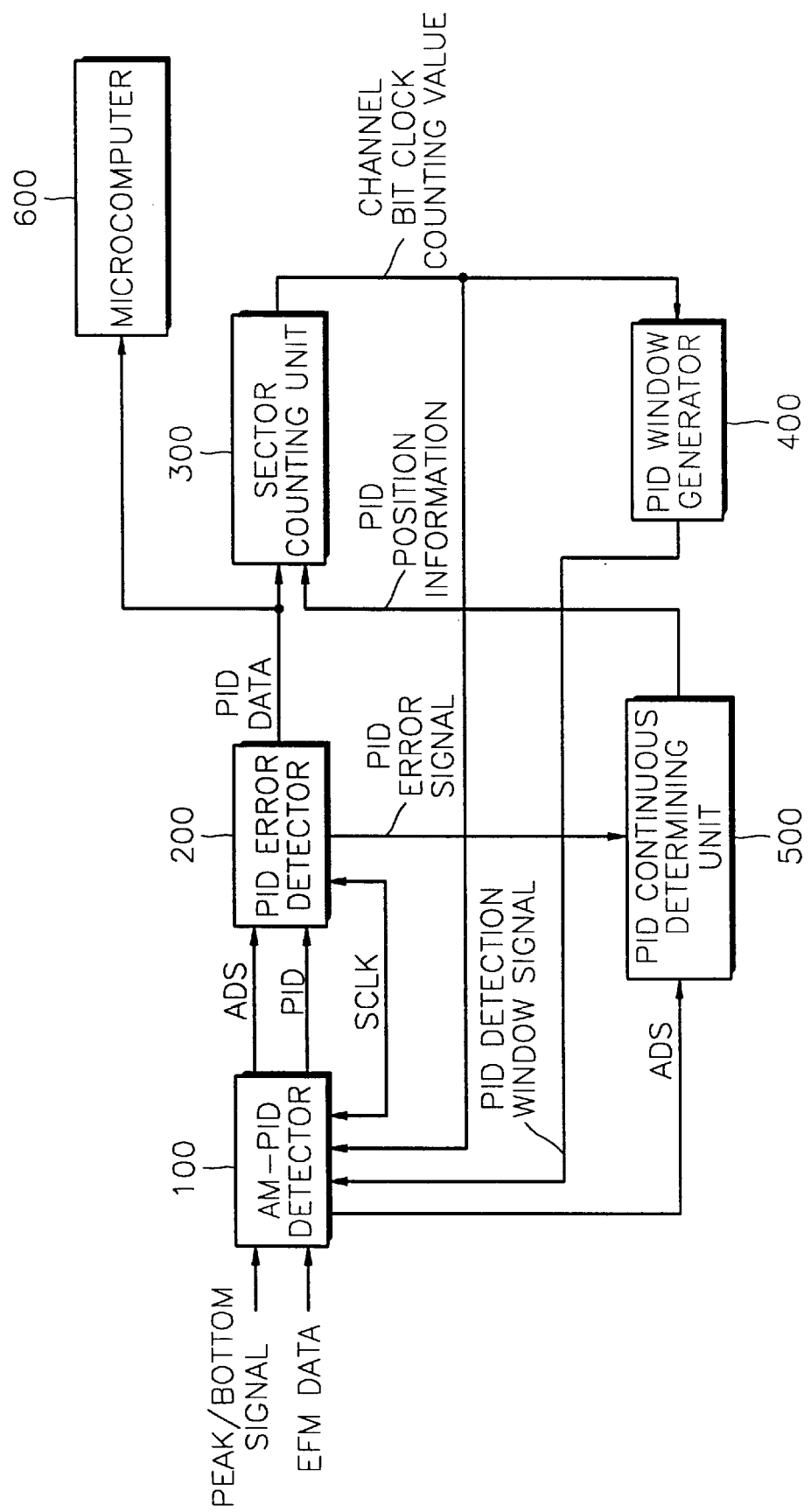
FIG. 3 is a block diagram of an apparatus for detecting and restoring physical identification (PID) data, according to an embodiment of the present invention.

Referring to FIG. 3, an address mark-physical identification detector (AM-PID, also referred to as a pattern detector) 100 searches for eight-to-fourteen modulation (EFM) data in the enable section of a peak/bottom signal received from a radio frequency (RF) amplification unit (not shown) or in a PID detection window signal section, to detect an AM pattern. The AM-PID detector 100 detects an AM pattern in the enable section of the peak/bottom signal immediately after track jumping for a searching operation or after track skipping, and detects an AM pattern in the PID detection window signal section in a normal mode. In this embodiment, in order to detect an AM pattern, the pattern of input EFM data is compared with a predetermined pattern pre-stored in an internal register, and if EFM data of the same pattern as the predetermined pattern is input, an AM detect signal (ADS), representing that an AM has been detected, is generated and output. When an AM is detected in the first header fields, the AM-PID detector 100 itself generates an ADS at the expected AM positions of the second, third and fourth header fields using a prescribed or predefined timing. Because the AM-PID detector creates its own ADS signal at the expected time, the apparatus thereby restores the PID data even when the actual AM is not properly detected from the medium.

Thus, when AM is detected in EFM data, the AM-PID detector 100 extracts a PID pattern from the subsequent 48 channel bits (4 bytes of PID+2 bytes of IED) from the AM, synchronizes the PID pattern with a symbol clock (SCLK) signal, and outputs the resultant PID pattern to a PID error detector 200. The PID error detector 200 is enabled by the ADS signal, and decodes the received 48 channel bits of PID pattern, thereby detecting whether an error is generated. If an error is generated in the PID pattern as a result of decoding the PID pattern, the PID error detector 200 outputs a PID error signal and again tries to decode the following PID pattern in response to the next received ADS. If no error is generated as a result of decoding the PID pattern, the PID error detector 200 outputs the decoded PID data to a microcomputer 600 and a sector counting unit 300.

The sector counting unit 300 counts the remaining size of a corresponding sector in response to the PID data received from the PID error detector 200, and outputs the counted value as a current channel bit clock counting value. The sector counting unit 300 can be realized by a counter which counts up to 2967 bytes (which is the size of one sector) as one cycle. Hence, a PID window generator 400 receives the channel bit clock counting value from the sector counting unit 300, and generates a window signal for PID detection (the signal is defined as a PID detection window signal) when the counting of one sector is concluded. Here, the enable section of the PID detection window signal can be designed so that it is changed by the microcomputer 600.

The sector counting unit 300 cannot accurately perform sector counting when no PID data is received, that is, when detection of PID data continuously fails. To solve this problem, an embodiment of the present invention includes a PID continuous determining unit 500. The PID continuous determining unit 500 determines the continuity or noncontinuity of PID data by monitoring the input of the address mark detection signal, and outputs a PID position information value, corresponding to a finally received address mark detection signal, to the sector counting unit when the counted value of the error signal is greater than a predetermined threshold value. Thereby, the sector counting unit 300 can properly count a channel bit clock according to the PID position information even in the event that the detection of PID data continuously fails.

In the operation of the PID detecting and restoring apparatus according to an embodiment of the present invention, with reference to FIGS. 3 and 4, immediately after track jumping or track skipping, the AM-PID detector 100 extracts 48 channel bits of PID pattern from a detected RF signal. The PID error detector 200 decodes the received PID pattern, so that it detects the generation or non-generation of an error and outputs a PID error signal and PID data corresponding to the result of the detection. If a third AM ② is not detected in the enable section of the second bottom signal (for reasons such as damage to the optical disk) as shown in FIG. 4, the AM-PID detector 100 receives a peak signal, a bottom signal, and EFM data, and performs PLL-synchronization for determining the enable section of an input signal using the peak signal and the bottom signal, thereby detecting an AM pattern and a PID pattern from the EFM data in the enable section of the input signal. The AM-PID detector 100 outputs an ADS signal ③ and a PID pattern to the PID error detector 200 if AM is first detected. The PID error detector 200 decodes the PID pattern and outputs a decoded PID pattern to the sector counting unit 300. The sector counting unit 300 counts channel bit clocks in response to the PID pattern and outputs a channel bit clock counting value to the PID window generator 400 and the AM-PID detector 100. The PID window generator 400 generates a PID detection window signal, and transmits the same in a "high level" when the counting of one sector is completed. Whether the counting of one sector is completed or not is determined by using the channel bit clock counting value. The PID detection window signal is applied to the AM-PID detector 100. The AM-PID detector 100 tries to detect AM and PID pattern in the enable section of the PID detection window signal. Thus, the AM-PID detector 100 does not try to detect AM and PID pattern using the peak signal or bottom signal at an inappropriate time. The apparatus according to the present invention therefore can properly detect an AM and a PID pattern, and avoid detecting an invalid pattern that appears to be an AM and PID pattern, even when the peak signal or bottom signal is generated in a data field section. Also, the apparatus according to the present invention can properly detect the AM and PID pattern, using the enable section of the PID detection window signal, even when the peak signal or bottom signal is not properly generated due to degradation or defects of the surface of an optical disk during tracking.

As described above, the present invention can properly detect and restore a PID pattern, i.e., the physical position information relating to a sector, regardless of degradation and defects of an optical disk (DVD-RAM) surface. Also, the present invention can normally detect and restore the PID pattern even when false peak and bottom signals are generated in a data field section, so that it improves the performance of a system and the reliability thereof.

What is claimed is:

1. An apparatus for providing physical identification data (PID) in an optical disk system having a radio frequency amplification unit, the apparatus comprising:
    a pattern detector outputting an address mark detection (AMD) signal and a PID pattern upon detecting, in an input signal, an address mark (AM) pattern and said PID pattern in an enable section of said input signal;
    a PID error detecting unit decoding said PID pattern, and outputting a PID error signal in response to an error in said decoding;
    a sector counting unit counting a remaining sector size and outputting a counted value as a channel bit clock counting value; and
    a PID window generator generating a PID detection window signal based on said channel bit clock counting value, said PID detection window signal being provided to said pattern detector.

2. The apparatus for providing physical identification data as set forth in claim 1, further comprising:
    a PID continuous determining unit determining continuity or noncontinuity of said PID by monitoring said input of said AMD signal, and outputting to said sector counting unit a PID position information value, corresponding to a finally received AMD signal, wherein said PID continuous determining unit performs said monitoring in response to a counted value of said PID error signal reaching a predetermined threshold.

3. An apparatus for providing physical identification data (PID) in an optical disk system having a radio frequency amplification unit, the apparatus comprising:
    a pattern detector outputting an address mark detection (AMD) and a PID pattern upon detecting, in an input signal, an address mark (AM) pattern and said PID pattern in an enable section of said input signal;
    a PID error detecting unit decoding said PID pattern, and outputting a PID error signal in response to an error in said decoding;
    a sector counting unit counting a remaining sector size and outputting a counted value as a channel bit clock counting value;
    a PID window generator generating a PID detection window signal based on said channel bit clock counting value, said PID detection window signal being provided to said pattern detector; and
    a PID continuous determining unit determining continuity or noncontinuity of said PID by monitoring said input of said AMD signal, and outputting to said sector counting unit a PID position information value, corresponding to a finally received AMD signal, wherein said PID continuous determining unit performs said monitoring in response to a counted value of said PID error signal reaching a predetermined threshold;
    wherein:
        during track jumping or skipping, said pattern detector detects said AM pattern and said PID pattern in said enable section of a peak signal and a bottom signal output from said RF amplification unit, and
        during tracking, said pattern detector detects said AM pattern and said PID pattern in an enable section indicated by said PID detection window signal.

4. The apparatus for providing physical identification data as set forth in claim 3, wherein said pattern detector generates said AMD signal at set times, determined based on an initial AM pattern detection time.

5. An apparatus for providing physical identification data (PID) in an optical disk system having a radio frequency amplification unit, the apparatus comprising:
    a pattern detector outputting an address mark detection (AMD) and a PID pattern upon detecting, in an input signal, an address mark (AM) pattern and said PID pattern in an enable section of said input signal;
    a PID error detecting unit decoding said PID pattern, and outputting a PID error signal in response to an error in said decoding;
    a sector counting unit counting a remaining sector size and outputting a counted value as a channel bit clock counting value; and
    a PID window generator generating a PID detection window signal based on said channel bit clock counting value, said PID detection window signal being provided to said pattern detector;
    wherein:
        during track jumping or skipping, said pattern detector detects said AM pattern and said PID pattern in said enable section of a peak signal and a bottom signal output from said RF amplification unit, and
        during tracking, said pattern detector detects said AM pattern and said PID pattern in an enable section indicated by said PID detection window signal.

6. The apparatus for providing physical identification data as set forth in claim 5, wherein said pattern detector generates said AMD signal at set times, determined based on an initial AM pattern detection time.

7. An apparatus for providing physical identification data (PID) in an optical disk system having a radio frequency amplification unit, the apparatus comprising:

a pattern detector outputting an address mark detection (AMD) and a PID pattern upon detecting, in an input signal, an address mark (AM) pattern and said PID pattern in an enable section of said input signal;

a PID error detecting unit decoding said PID pattern, and outputting a PID error signal in response to an error in said decoding;

a sector counting unit counting a remaining sector size and outputting a counted value as a channel bit clock counting value; and a PID window generator generating a PID detection window signal based on said channel bit clock counting value, said PID detection window signal being provided to said pattern detector;

wherein said input signal comprises an eight-to-fourteen modulation (EFM) data stream.

* * * * *